Patented Sept. 8, 1953

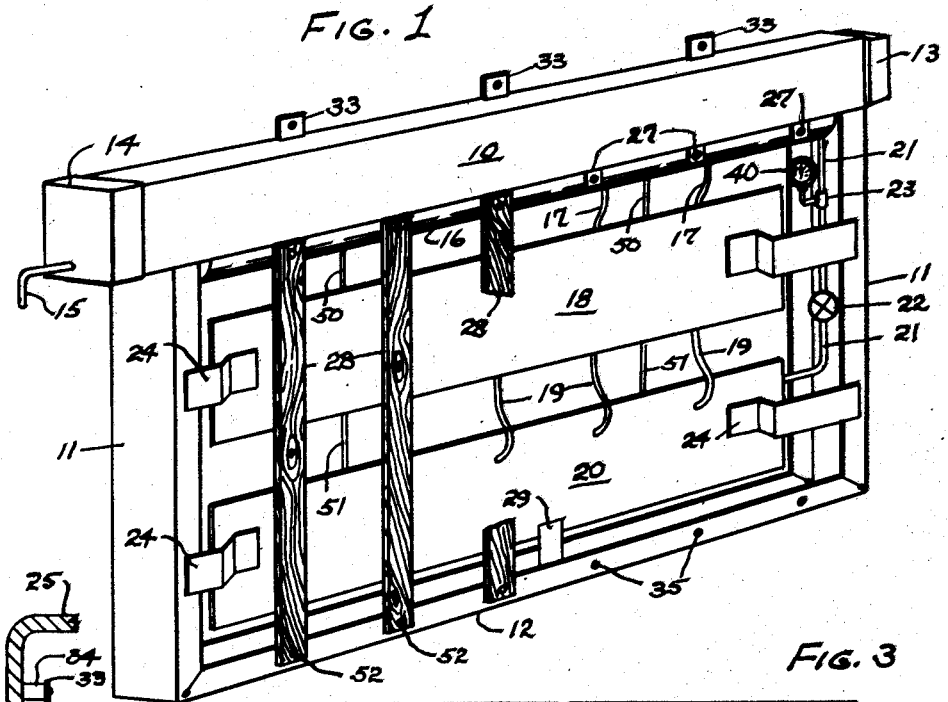
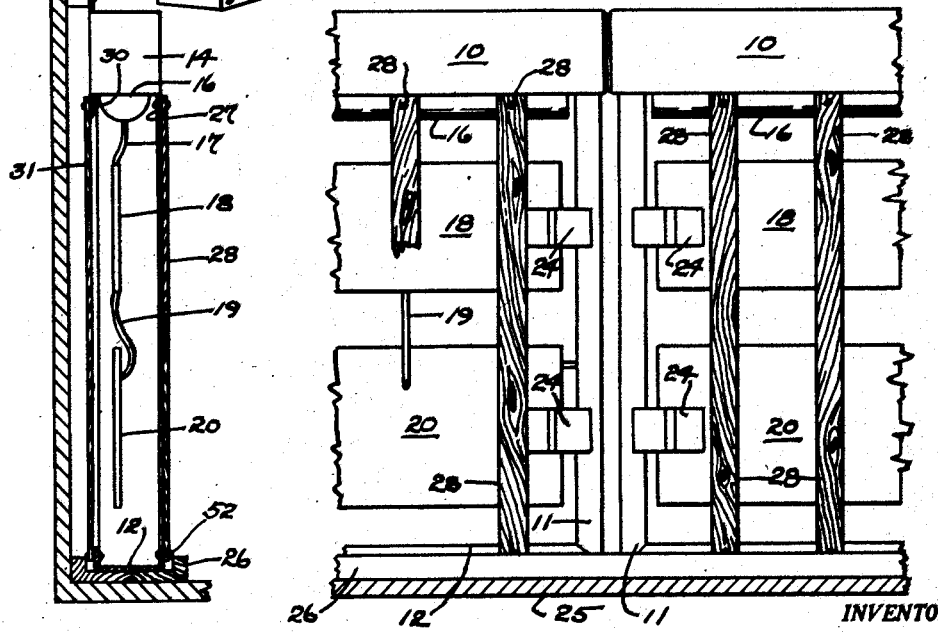

2,651,183

UNITED STATES PATENT OFFICE 2,651,183

COMPACT REFRIGERATION UNIT FOR VEHICLES USING ICE FOR CONDENSING VOLATILE REFRIGERANTS

Robert T. Brizzolara, New Dorp, N. Y., assignor to Cold Control, Inc., New York, N. Y.

Application September 3, 1949, Serial No. 114,015

8 Claims. (Cl. 62—15)

1

This invention relates to refrigeration apparatus, and relates more particularly to refrigeration apparatus for cooling foods and other perishable products in vehicles such as railway refrigerator cars and motor transports.

Due to the demand by the public for frozen food products, refrigeration apparatus for cooling the interiors of railway refrigerator cars and motor transports, is required to produce temperatures as low as 0° F. Mechanical rerfigeration and Dry Ice units can readily provide such low temperatures but the units of both types which have been available in the past have had the disadvantages that they occupy valuable cargo space, have considerable weight, and are difficult to install and remove, and to service. Mechanical refrigeration units have the additional disadvantage that their cost is high and is not believed to be justified since the units are in service but a small fraction of the time the vehicles they are installed in are in use.

This invention provides a compact, self contained refrigeration unit of the Dry Ice type, which has flat inner and outer surfaces, which is relatively long, relatively high and relatively narrow, and which is adapted to be attached to the side walls of the interior of a railway refrigerator car, motor truck or other vehicle. The unit has small thickness and therefore occupies little cargo space. It is easily removed when not required in service, and for servicing and replacement.

In one embodiment of the invention the unit comprises an ice bunker or bin mounted on the tops of two vertical, channel frames, the bottoms of which are attached to a horizontal channel frame which is adapted to be slid into and out of guide fastenings on the floor of a vehicle. A condenser is attached to the underside of the ice bin, and is connected to one or more thin, flat evaporators suspended underneath same within the confines of the channel members. One end of each ice bin is flared outwardly so that the other end of the ice bin of a corresponding, similar unit can be telescoped thereinto, whereby two or more units can be interconnected for providing any desired length and capacity. All interconnected units can be iced simultaneously through a single, conveniently located connection.

Objects of the invention are to provide a refrigeration unit for cooling the cargo space of a vehicle, which requires small space, which can easily be installed and removed, which has low cost, and which can easily be connected to similar units for providing any desired capacity.

2

The invention will now be described with reference to the drawing, of which:

Fig. 1 is a view in perspective of a refrigeration unit embodying this invention;

Fig. 2 is a partial sectional view of the unit and of the wall of a vehicle to which the unit is attached, and Fig. 3 is a partial side elevation showing the interconnected ends of two of the units.

The unit illustrated by the drawing comprises a hollow ice bin 10 attached to the upper ends of the two vertical channel members 11, the lower ends of which are attached to the horizontal channel member 12. The ice bin thus forms the upper structural member of the unit. The ice bin is tapered inwardly at its open right hand end, and has the removable cover 13 fitted around the open end. The other end of the ice bin is also open, and has the removable cover 14 fitted therearound. The ends of the unit are so sized that the tapered end of one unit and the adjacent untapered end of a similar unit can be telescoped together so that there is but one ice bin common to both, or to others if more than two units are interconnected.

The cover 14 is provided with the tube 15 for venting off carbon dioxide when Dry Ice is used in the unit, and can be used for draining off water in case water ice is used.

The bottom of the ice bin 10 has attached thereto the condenser 16 which, in the form illustrated by the drawing, is a split pipe with closed ends, which extends between the vertical channel members 11, and contacts the ice bin along substantially its entire length.

The evaporator 18 is located below, and suspended from, the condenser 16 by the rods 50, and the similar evaporator 20 is suspended from the evaporator 18 by the rods 51.

The bottom of the condenser 16 is connected with the top of the evaporator 18 by the small refrigerant tubes 17. The bottom of the evaporator 18 is connected with the upper portion of the evaporator 20 by the small refrigerant tubes 19.

The evaporators 18 and 20 are conventional plate type evaporators constructed, for example, from sheet iron plates having deformed surfaces pressed therein for forming annular volumes for receiving a volatile refrigerant, the edges of the plates being welded together, and forming thin, light weight containers.

The interior of the upper portion of the evaporator 20 is connected by the tubing 21, the stop valve 22 and the fitting 23 with the interior of the condenser 16.

The evaporators 18 and 20 are secured in position by the clips 24 which may be welded to the vertical channel members 11. The horizontal channel member 12 has the clip 29 extending vertically above its center and attached to the lower evaporator 20 and serves to restrain swinging of the evaporators during movement of the vehicle in which the unit is used.

A vehicle 25 in which one or more of the units is to be used, has the recessed guide 26 into the recess of which the horizontal channel member 12 is slidably fitted as illustrated by Fig. 2 of the drawing.

The front of the ice bin 10 has the downwardly extending clips 27 attached thereto, and which are fastened as illustrated by Fig. 2 of the drawing, to the upper ends of the front wall slats 28 which are spaced apart, and the lower ends of which are fitted into the recess in the guide 26 in contact with the channel member 12, and which is attached to the member 12 by the screws 52 extending through the holes 35 in the member 12.

The back of the ice bin 10 has the downwardly extending clips 30 to which are attached the upper ends of the back wall slats 31.

The ice bin also has the upwardly extending clips 33 attached thereto, and which are attached by the spacers 34 to a vertical side of the vehicle 25.

In operation, the system is charged with any suitable volatile refrigerant such as Freon, and the ice bin 10 is filled with Dry Ice. If several interconnected units are used they are all filled with Dry Ice from a single connection. The condensed refrigerant drains down by gravity from the condenser 16 into the evaporators 18 and 20 where it expands and is boiled off to establish any desired low temperature.

The thermostatic valve 22 responds to the ambient temperature in the cargo space, and preferably is of the snap action type which closes when the desired low temperature is reached. When the valve closes vapor developing in the plate 20 above the points of entrance of the tubes 19 is trapped and replaces entrained liquid and pushes it back into the condenser 16 thereby filling it and condensing all vapor in the condenser and effectively preventing it from acting as a condenser. A flooded condenser is an inoperative condenser and becomes a liquid cooler only. The condenser failing to perform as such stops all refrigeration effect by evaporation. Upon the opening of the valve when refrigeration is again called for, the vapor trap is opened, and the liquid refrigerant is again permitted to drain into the evaporators.

Liquid drains down through the tubes 17 and 19 and the plate 18. Likewise vapor passes upwardly through these same paths as well as freely through the tube 21 when the valve 22 is open. Such dual purposes are achieved is a so-called "one pipe" system commonly associated with steam heating. What probably happens is that some tubes act as vapor lines while others act as liquid lines, this action being interchangeable. When the tube 21 is closed by the valve 22, the tubes 19 cannot return all of the vapor to the condenser with the result that vapor is trapped in the upper portion of the plate 20 as described in the foregoing.

The pressure gauge 40 attached to the fitting 23 shows the vapor pressure in the system.

As illustrated by Fig. 3, two of the units are interconnected by telescoping the ends of their ice bins 10 together with the covers 13 and 14 removed except from the outermost ends. This provides in effect, a single ice bin for several units, and which can readily be filled from the center of a vehicle having a central door, or from one end of a vehicle having an end door.

It will be noted that the condenser, the evaporators and all the fittings are well within the confines of the channel supporting members, and are protected from mechanical damage caused by falling or sliding cargo, by the protective front and back wall slats 28 and 31 respectively.

While one embodiment of the invention has been described for the purpose of illustration, it should be understood the invention is not limited to the exact apparatus and arrangement of apparatus illustrated, as modifications thereof may be suggested by those skilled in the art without departure from the essence of the invention.

What is claimed is:

1. A refrigeration unit comprising a relatively long, relatively narrow ice bin, a relatively long, relatively narrow condenser in contact with the lower side of the bin, a first plate type, relatively long, relatively narrow evaporator spaced below said condenser, a second plate type, relatively long, relatively narrow evaporator spaced below said first evaporator, a first plurality of small tubes connecting the bottom of the condenser with the upper portion of the first evaporator, a second plurality of small tubes connecting the bottom of the first evaporator with the interior of the second evaporator below the top thereof, and a tube having a thermostatically controlled stop valve connected therein connecting the second evaporator below the top thereof with the bottom of the condenser.

2. A refrigeration unit comprising a relatively long, relatively narrow ice bin, a relatively long, relatively narrow condenser in contact with the lower side of said bin, a first plate type, relatively long and relatively narrow evaporator supported directly below said condenser, a second plate type, relatively long and relatively narrow evaporator supported directly below said first evaporator, a first plurality of small tubes connecting the lower portion of said condenser with the upper portion of said first evaporator at a plurality of longitudinally spaced points, a second plurality of small tubes connecting the lower portion of said first evaporator with the upper portion of said second evaporator at a plurality of longitudinally spaced points below the top thereof, and means including a vapor tube connecting said condenser with said second evaporator at a location between the top of said second evaporator and said points.

3. In a vehicle body having transversely extending end walls, longitudinally extending side walls, a roof and a floor, refrigeration apparatus comprising two similar units extending from adjacent said floor to adjacent said roof, each of said units having a horizontally extending, relatively narrow and relatively long ice bin, a relatively narrow and relatively long condenser contacting the under side of said bin, a relatively long and relatively narrow, plate type evaporator supported under and connected by a plurality of longitudinally spaced liquid inlet tubes and by a vapor outlet tube with the condenser, the ice bins having end openings for the reception of ice, an open end of one bin being adjacent and connected to an open end of the other bin whereby ice inserted into the bin of one unit can be passed into the bin of the other unit, the other ends of said bins having covers thereon, said units extending in alignment parallel to and adjacent one of said side walls.

4. The invention claimed in claim 3 in which the open end of the bin of one unit is telescoped into the adjacent open end of the bin of the other unit.

5. The invention claimed in claim 3 in which the floor of the body has a recessed guide member, and the bottoms of the units are slidably fitted in the recess in the guide member.

6. The invention claimed in claim 3 in which the vapor tube contains a thermostatically controlled stop valve.

7. In a vehicle body having a roof, a floor and a longitudinally extending side wall, a refrigeration unit comprising a relatively long, relatively narrow ice bin having an opening at one end for the reception of ice, said bin extending substantially horizontally alongside and parallel said wall adjacent said roof and forming the upper structural frame member for said unit, a lower, relatively long and relatively narrow frame member supported adjacent said floor, relatively narrow end frame members extending substantially vertically between the ends of said bin and lower frame member, a condenser attached to the lower side of said bin and extending in contact with said bin substantially the entire length thereof, upper and lower, relatively thin and relatively long plate type evaporators extending directly below said condenser, a first plurality of longitudinally spaced-apart tubes connecting the bottom of said condenser with the upper portion of said upper evaporator, a second plurality of tubes connecting the bottom of said upper evaporator with the upper portion of said lower evaporator at a plurality of longitudinally spaced points below the top of said lower evaporator, and means connecting with said lower evaporator between said points and said top of said lower evaporator for returning vapor to said condenser, said condenser and evaporators extending in substantially vertical alignment within the space bounded by planes extending between the opposite longitudinal sides of said bin and said lower frame member.

8. The invention claimed in claim 7 in which the last mentioned means comprises a vapor tube having connected therein a thermostatically controlled stop valve.

ROBERT T. BRIZZOLARA.

References Cited in the file of this patent

UNITED STATES PATENTS

| Number | Name | Date |
| --- | --- | --- |
| 1,923,472 | Baird | Aug. 22, 1933 |
| 2,125,888 | Cordrey | Aug. 9, 1938 |

FOREIGN PATENTS

| Number | Country | Date |
| --- | --- | --- |
| 392,370 | Great Britain | May 18, 1933 |